May 18, 1965  T. A. INSOLIO  3,183,747
GLASS CUTTING MACHINE
Filed April 15, 1963  10 Sheets-Sheet 1

INVENTOR.
Thomas A. Insolio
BY
Webb, Mackey + Burden
HIS ATTORNEYS

May 18, 1965  T. A. INSOLIO  3,183,747
GLASS CUTTING MACHINE
Filed April 15, 1963  10 Sheets-Sheet 2

INVENTOR.
Thomas A. Insolio
BY
Webb, Mackey & Burden
HIS ATTORNEYS

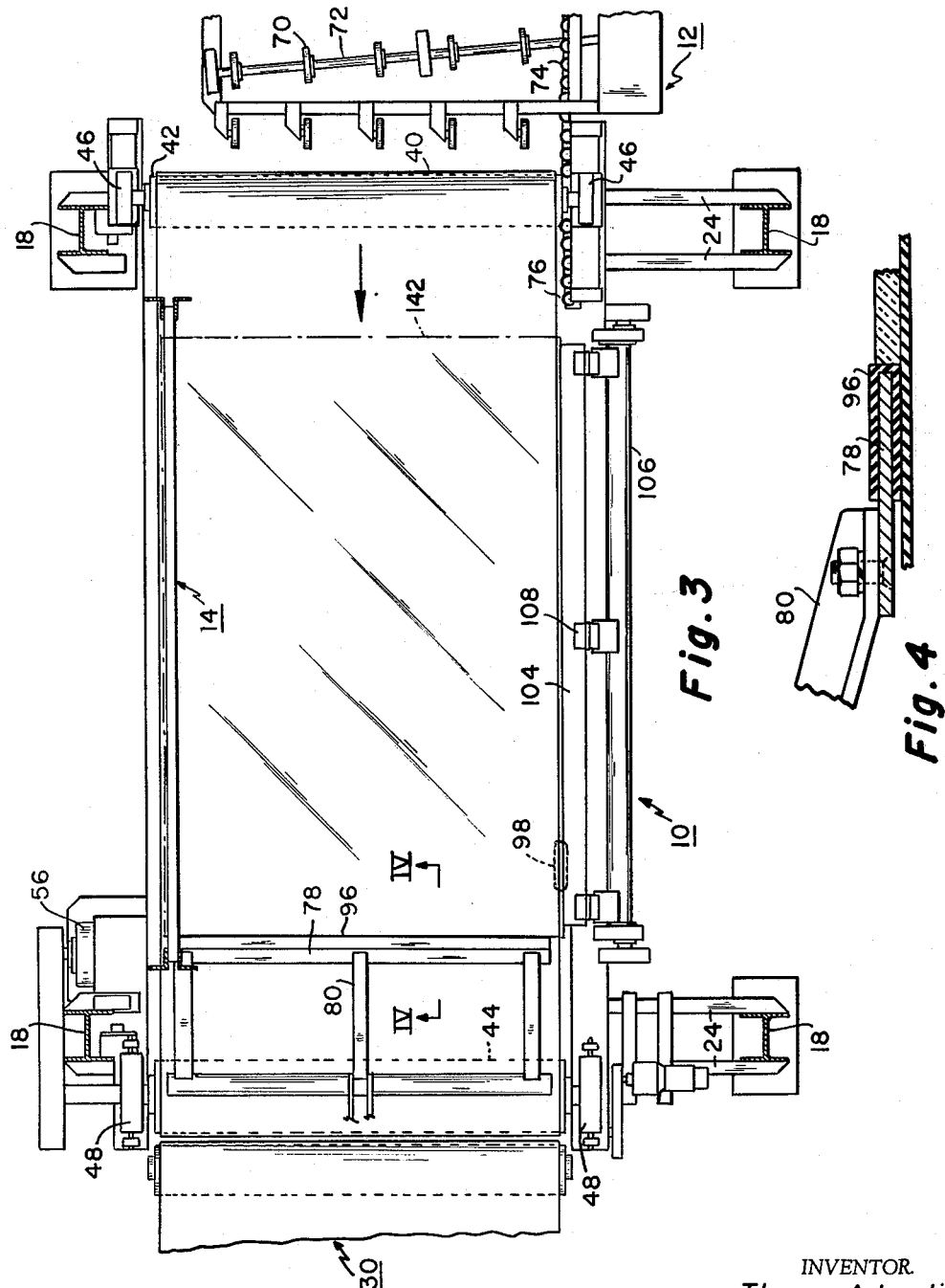

INVENTOR.
Thomas A. Insolio
BY
Webb, Mackey & Burden
HIS ATTORNEYS

INVENTOR.
Thomas A. Insolio
BY
Webb, Mackey & Burden
HIS ATTORNEYS

May 18, 1965 T. A. INSOLIO 3,183,747
GLASS CUTTING MACHINE
Filed April 15, 1963 10 Sheets-Sheet 7

INVENTOR.
Thomas A. Insolio
BY
Webb, Mackey & Burden
HIS ATTORNEYS

INVENTOR.
Thomas A. Insolio

BY Webb, Mackey & Burden

HIS ATTORNEYS

INVENTOR.
Thomas A. Insolio
BY
Webb, Mackey & Burden
HIS ATTORNEYS

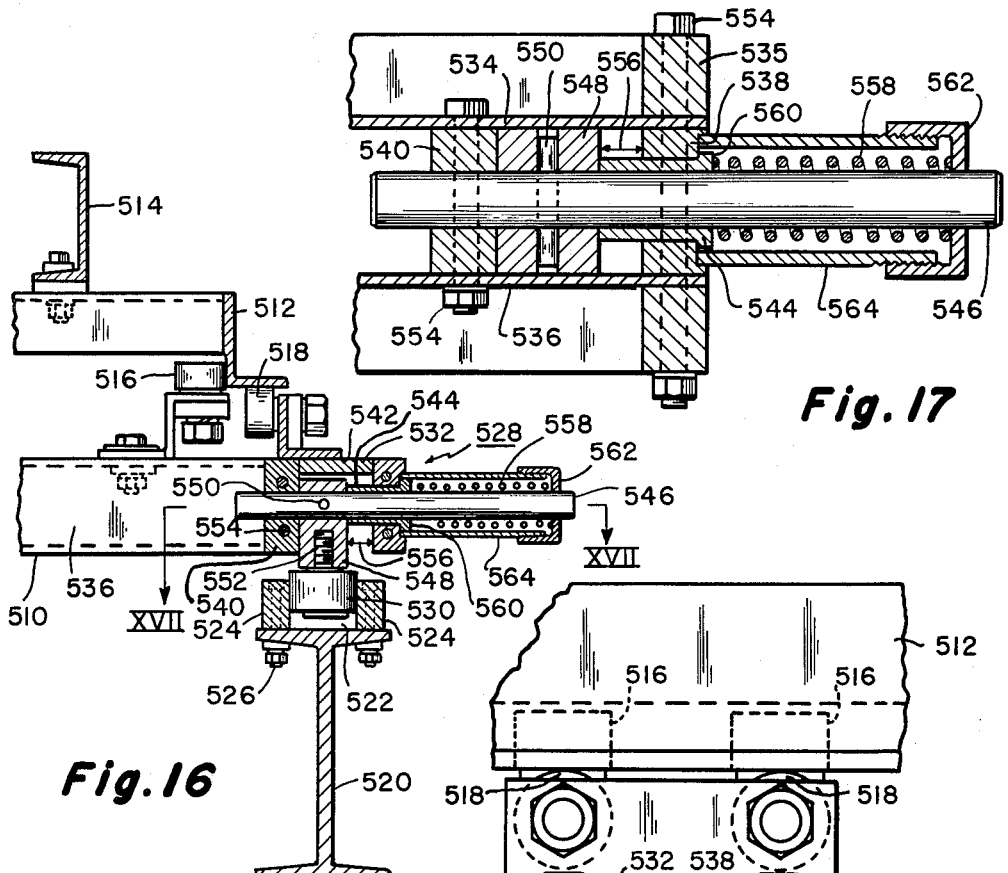
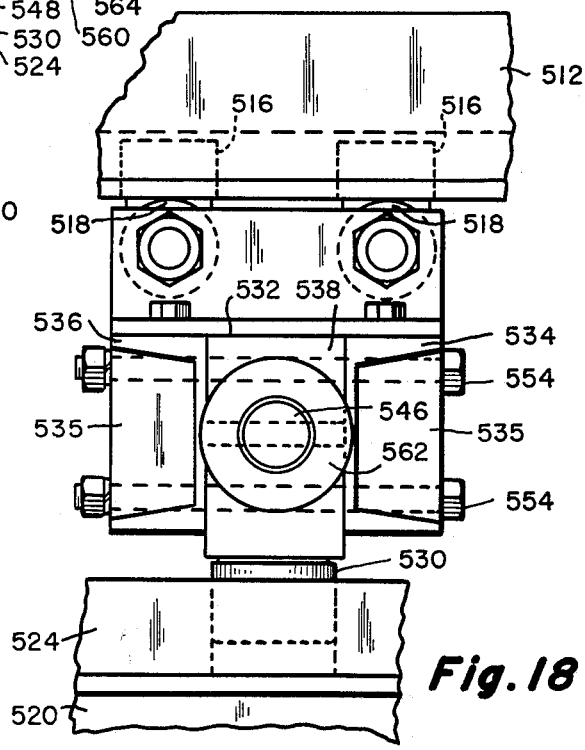

United States Patent Office 3,183,747
Patented May 18, 1965

3,183,747
GLASS CUTTING MACHINE
Thomas A. Insolio, Jeannette, Pa., assignor to American-Saint Gobain Corporation, Kingsport, Tenn., a corporation of Delaware
Filed Apr. 15, 1963, Ser. No. 273,002
11 Claims. (Cl. 83—12)

This invention relates to improved glass cutting methods and relates in particular to a new glass cutting machine.

In modern methods of manufacturing and processing of sheet glass, stock sheets are cut or scored and "broken" into smaller sections of glass, as such sheets are conveyed on processing lines that consist of multiple conveyor and processing units. In large producing plants, a very large number of different sized pieces is cut each day from a large variety of stock sheets. The planning, scheduling and processing of the large number of different sized pieces is a very complex operation.

A major economic factor encountered in the cutting of stock sheets is to obtain the best yield of usable pieces of glass from a given sized sheet and yet supply the desired pieces of glass. This requires decision making in the planning and scheduling phases to obtain the optimum use of the glass sheet. Such optimum use most often requires that a plurality of different sizes be cut from a given stock sheet. It is readily apparent that another limiting factor in the processing and cutting of glass sheets is the speed at which the stock sheets can be processed and cut into pieces of preselected sizes. This is especially true where frequent scheduled changes in the sizes are necessary. Manual hand cutting and handling of the glass sheets is a slow method and yet this method is still extensively employed in many major producing plants.

One prerequisite with any system that depends on a high speed for its productivity is the proper timing of the various components in the system, i.e., the cutting component, the breaking component, the take-away conveyor and the distributing conveyor so that the sheets or pieces produced therefrom travel or flow as a smooth stream through all components.

In the use of my new and novel "Method and Apparatus for Cutting, Transporting and Distributing Glass Sheets," set forth in my co-pending patent application Serial No. 235,932, filed November 7, 1962, automatic machinery may index a sheet on the cutting table of a cutting or scoring machine and one or more, usually several, glass cutting or scoring heads are caused to bear on the surface of the sheet and are propelled across the sheet in a manner to effect transverse scores. To maintain a steady flow of cross-cut strips to the various processing lines, it is necessary that the cutting operation be completed as rapidly and efficiently as possible.

Glass cutting machines employed in conjunction with the method of my above mentioned patent application are composed of cutting heads which are mounted on bars which are in turn suspended from an overhead bridge. The overhead bridge is driven across and over the indexed sheet which is to be scored. The cutters, mounted on the bridge, contact and score the sheet during one-half of the bridge cycle. The retraction of the cutters occurs as the bridge starts to return to its starting position. The cutting heads are generally constructed in a manner that they may be lowered into their cutting positions for the cutting or scoring movement of the overhead bridge over the indexed glass sheets and may be raised upon the return cycle of the bridge during which time the scored sheet is generally removed and a new or unscored glass sheet is indexed on the cutting table for the next cycle.

The cutter bridge must accelerate from its starting position to its position during the cut where there is zero increasing acceleration in a gradually diminishing manner so that the transition from acceleration to deceleration is accomplished smoothly and harmonically. Also, deceleration must be accomplished in a gradually increasing manner so that the stopping point of the bridge, where there is zero deceleration, may be accomplished with a minimum of shock. To achieve the maximum harmonic relationship, the bridge should accelerate only to the midpoint of its travel over the sheet where it should commence deceleration in a gradually increasing manner. If acceleration or deceleration must take place over a shorter distance than the other, then an ideal harmonic relationship has not been attained.

My invention is a cutting machine which receives a sheet from the preceding conveyor and conveys it onto a cutting table by means of a belt conveyor, the belt conveyor is brought to a stop while a transverse indexing bar drops onto the belt conveyor in front of the sheet so that the momentum of the sheet carries it against the indexing bar and it is indexed along its leading edge as it comes to a stop. Immediately upon coming to a stop, a longitudinal indexing bar advances transversely along the side of said sheet so as to propel the sheet a short distance transversely and index the sheet longitudinally. The glass cutters are then propelled across the sheet by means of a cutter bridge that is driven by a horizontally positioned driver arm that is rotated about its vertical axis. The driver arm is connected to the bridge in a pivotal sliding manner so that the bridge may advance across the sheet while the driver arm completes one-half of a revolution. The longitudinal indexing bar then retracts and the transverse indexing bar rises. The cutters of the glass cutter are retracted or raised and the conveyor belt conveys the scored sheet from the cutting table while it conveys the next sheet onto the cutting table and while the driver arm completes one revolution and drives the cutter bridge back over the cutting table preparatory for the next scoring operation.

The method and apparatus for indexing is rapid and accurate and the means for driving the cutting bridge across the indexed sheet provides an optimum harmonic relationship between displacement and time that has not heretofore been known.

It is, therefore, the object of the present invention to provide a cutting machine for use in automatic processing lines that will receive a glass sheet from a preceding conveyor, convey it onto a cutting table, index the sheet on the cutting table, score it transversely and convey the scored sheet to a succeeding conveyor unit automatically and rapidly.

It is also an object of the present invention to provide a means for automatically indexing a glass sheet on an endless belt conveyor upon stopping the conveyor, transversely as the sheet comes to a stop and longitudinally immediately thereafter.

It is a further object of the present invention to provide a means for automatically indexing a glass sheet on an endless belt conveyor, transversely as the conveyor is stopped and longitudinally immediately thereafter, and to provide harmonic driving means for propelling glass cutters transversely across the glass sheet to effect predetermined scores on the sheet.

It is a still further object of the present invention to provide a driving means for propelling a cutter bridge of a glass cutting or scoring machine across an indexed sheet at a gradual acceleration of the bridge until it reaches maximum speed at midtable and then a gradual deceleration of the bridge until the end cut position is reached where the speed reaches zero and the bridge is returned.

It is also an object of the present invention to provide an apparatus for driving the cutter bridge of a cutting machine across an indexed sheet wherein the rate of acceleration is maximum near the start of travel and the rate of deceleration is maximum near the end of travel, so as to provide a harmonic relationship between displacement of the bridge and the time allotted for the cutting action.

It is a further object of the present invention to provide a means for driving the cutting bridge of a cutting machine over an indexed sheet wherein the rate of acceleration is greatest at the start of the cut and diminishes gradually until the bridge reaches maximum speed at midtable and then decelerates gradually but increasingly until the speed of the cutter bridge reaches zero at the end of the cut.

Other objects and advantageous features of the present invention will be obvious from the following description and drawings wherein:

FIGURE 3 is a top plan view partially in section taken along the line III—III of FIGURE 1;

FIGURE 4 is an enlarged sectional view of the indexing bar 78 of the apparatus of FIGURES 1 through 3, taken along the line IV—IV of FIGURE 3;

FIGURE 16 is a side elevation, partially broken away, of a section of a harmonic bridge drive constituting a second embodiment of the features of the present invention;

FIGURE 17 is a cross-sectional drawing of the resilient cam mounting 528 of FIGURE 16 taken along the line XVII—XVII of FIGURE 16; and FIGURE 18 is an end elevation view of the driver arm 510 of FIGURE 16.

Figure 1:
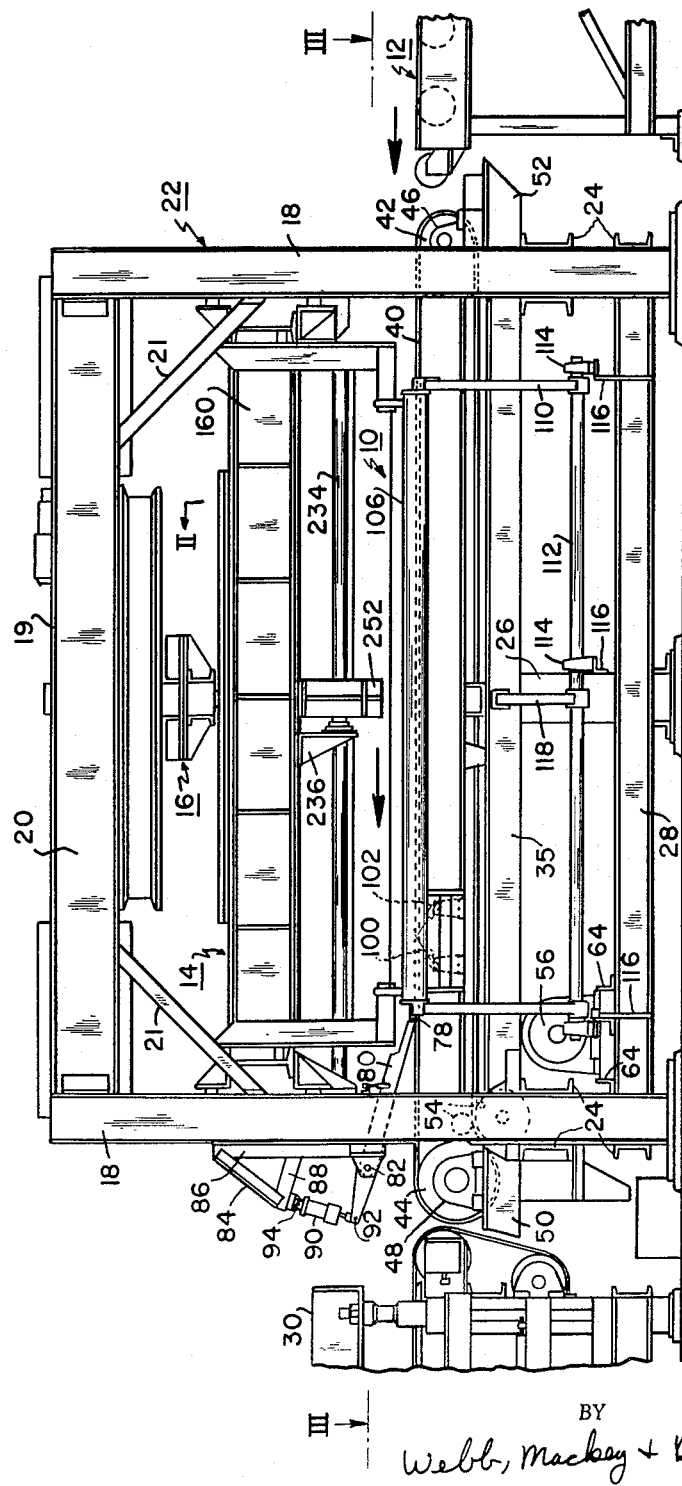
FIGURE 1 is a side elevation view of an apparatus embodying the novel features of the present invention.

In FIGURE 1, there is shown a cutting machine 22 positioned between an indexing table 12 and a glass breaker 30. The cutting machine 22 of the present invention is normally positioned within a primary or secondary apparatus for handling or cutting stock sheets of glass. Such overall apparatus is described in my co-pending application entitled "Method and Apparatus for Cutting, Transporting and Distributing Glass Sheets," Serial No. 235,932, filed November 7, 1962. Such apparatus conventionally receives glass sheets from an indexing device such as indexing table 12, which is a well-known apparatus employed for such purposes, and which is described in the aforementioned co-pending patent application. Glass sheets are conveyed in the direction of the arrow shown in FIGURE 1 onto a cutting table shown generally at 10, wherein it is scored transversely by a predetermined number of glass cutters and then is conveyed in the direction of the arrow onto a breaking apparatus 30 designed to break the glass along the score lines effected by the cutting machine 22. The present cutting machine consists of cutting table 10, a cutter bridge shown generally at 14, and a harmonic cutter bridge driving apparatus shown generally at 16. The apparatus of FIGURES 1 through 11 is supported on a frame 19 which consists of upright beams 18 and cross beams 20 and 24. Additional support for frame 19 is provided by braces 21. The table 10 is supported by leg members 26 (see FIGURE 2) and cross members 28, 32, 33, 34 and 35. Cross members 28 and 35 are also supported by cross beams 24 of frame 19.

Figure 2:
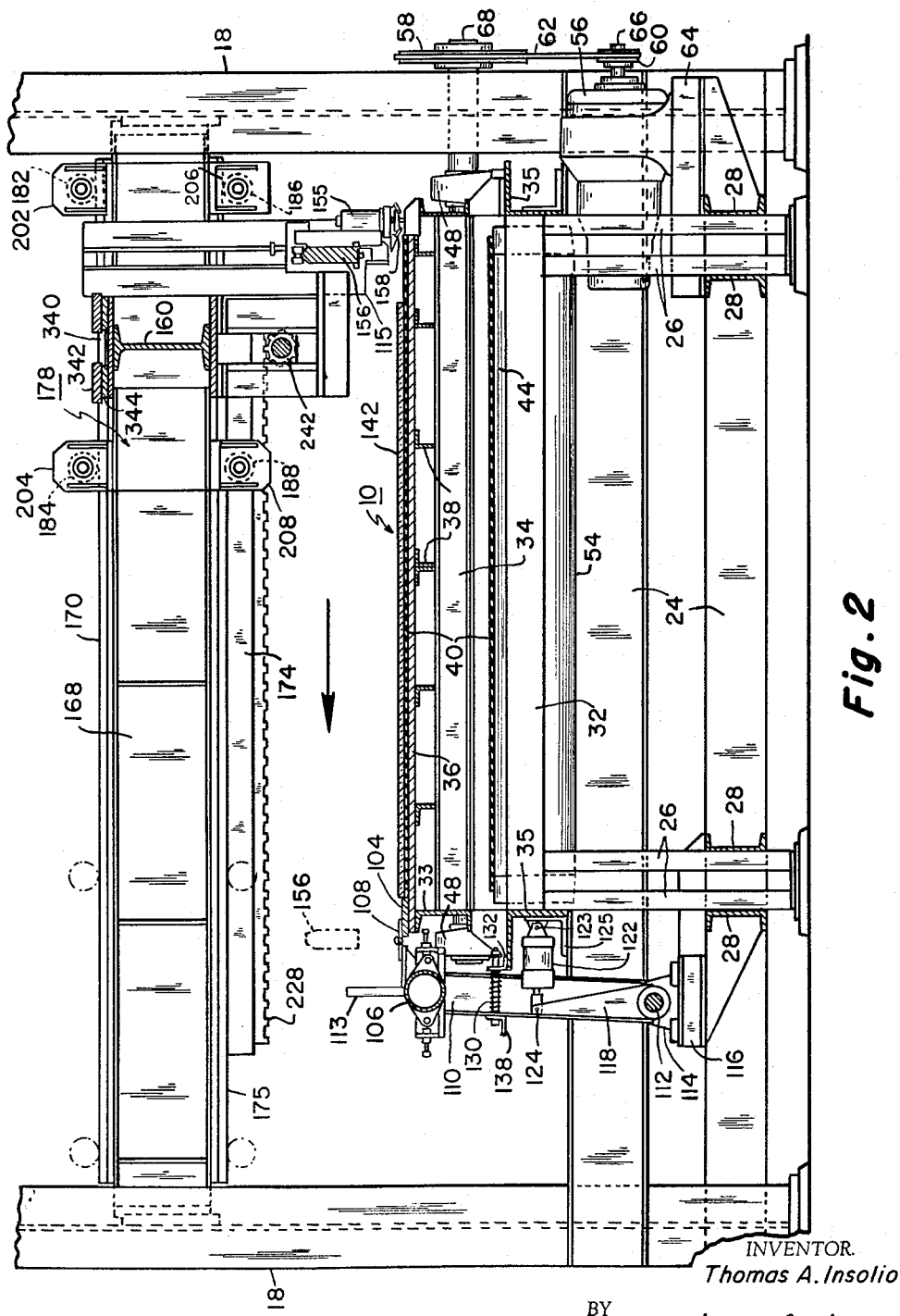
FIGURE 2 is a cross-sectional view of the apparatus of FIGURE 1 taken along the line II—II thereof.
Figure 5:
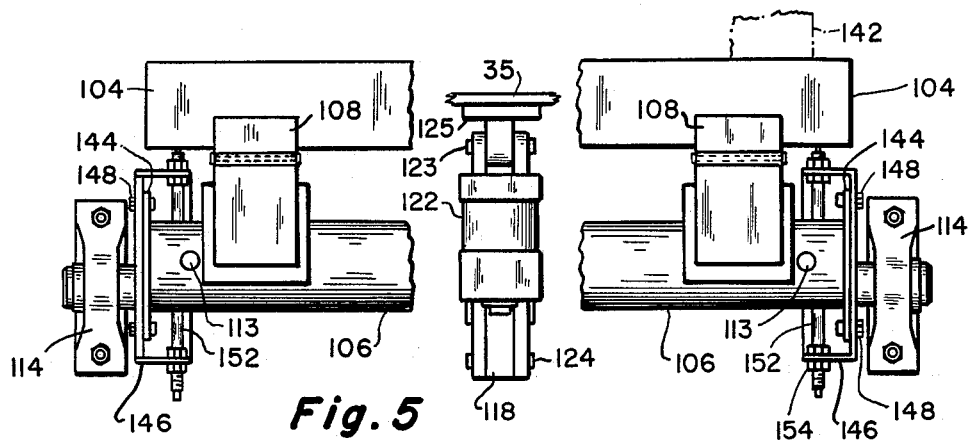
FIGURE 5 is an enlarged top plan detailed view of broken-away segments of the indexing bar 104 of the apparatus of FIGURE 1.

The cutting table itself consists of a sheet of Masonite or other fibrous material as shown at 36 in FIGURE 2, which is supported by a plurality of angle members 38 supported at their extremities on the cross members 34.

The conveyor consists of an endless belt 40 that is mounted on rollers 42 and 44 (FIGURE 1) that are, in turn, rotatably mounted within appropriate roller housings 46 and 48 that are attached to and supported by extensions 50 and 52 of the cross beams 35. The endless belt 40 is positioned so that its top surface passes over and is supported by sheet 36 while its bottom surface passes generally under sheet 36 and cross members 34. The conveyor belt 40 is provided with suitable retaining and take-up rollers 54 (depicted by the dotted lines in FIGURE 1). The conveyor belt 40 is driven by a motor 56 through conventional sheaves 58 and 60 and a belt 62 (FIGURE 2). The motor 56 is mounted on cross members 24 of the frame 19 and cross members 28 of table 10 by suitable support members 64. Sheave 58 is mounted on shaft 68 of the roller 44. Consequently, when motor 56 is energized to drive roll 44, endless belt 40 provides a conveyor surface for glass sheets indexed on indexing table 12 and conveyed in the direction of the arrow to the table 10 of the cutting apparatus 22.

As shown by FIGURES 3, indexing table 12 indexes the sheets by means of angularly mounted wheels 70 mounted to a rotating shaft 72 so that one longitudinal edge of the sheet is indexed along a series of wheels 74. Wheels 74 are usually constructed of a hardened rubber or other resilient material and guide the strip onto the conveyor belt 40 of the cutter table 10 so that the edge of the sheet projects over the edge of the belt 40 (greater than ½" overlap) into the space identified as 76. The wheels 74 are continued onto the cutting apparatus and particularly onto the sheet 36 of table 10 so that the sheets as they travel in the direction of the arrow continue to be roughly indexed along the line of the horizontally mounted wheels 74 and so that the sheets of glass as conveyed by endless belt 40 onto the cutting table 10 project more than ½" over the edge of the belt 40 into the space 76.

It will be appreciated that although the sheet is roughly indexed longitudinally as it is conveyed onto the table 10, such indexing will not be sufficiently accurate for scoring. Such preliminary indexing merely positions the sheet for subsequent accurate indexing on the cutter table 10.

As the sheet progresses onto the cutting table 10 and particularly onto the surface of the sheet 36 of the table 10, it is indexed transversely by means of an indexing bar 78. The indexing bar 78 is mounted on lever arms 80 which are pivotally connected to upright members 18 as at 82 (see FIGURE 1). Frame members 84, 86 and 88 are attached to upright members 18 to provide a means of supporting a pneumatic cylinder 90 which is pivotally connected to the arm 80 which extends beyond pivot 82 as at 92. The pneumatic cylinder 90 is also pivotally attached to the support member 88 as shown at 94. The indexing bar 78 is pivotally supported above the cutting table 10 and endless belt 40, and as shown by FIGURE 4, is provided with a resilient rubber cover 96 that is disposed to contact the leading edge of a glass sheet being conveyed onto conveyor 40. The indexing bar 78 through arms 80 and pneumatic cylinder 90 is disposed to be lowered onto the table and index glass sheets.

Figure 6:
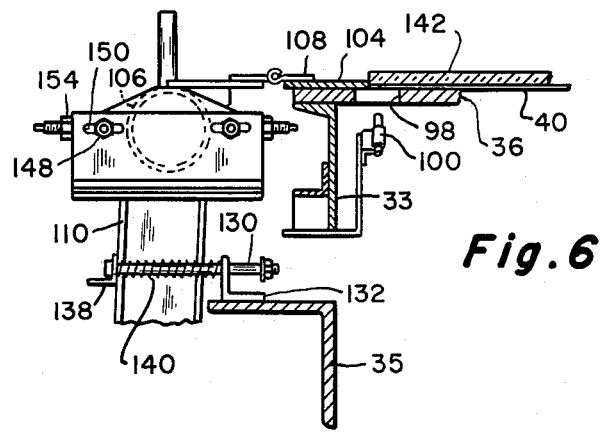
FIGURE 6 is an enlarged detailed end elevation view, partially in section, of the indexing bar 104 of the apparatus of FIGURE 1.
Figure 6A:
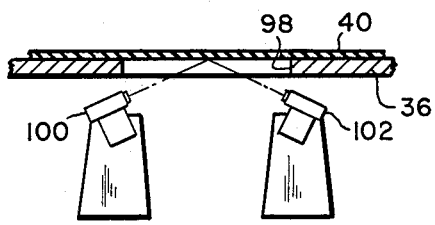
FIGURE 6a is a schematic view of the sensing device of FIGURE 6.

There is provided at a predetermined position on the sheet 36 of the table 10, a slot 98 (see FIGURES 3 and 6a). The slot 98 encompasses a portion of the area 76 as shown by FIGURE 3. Positioned beneath the slot 98 is a photoelectric cell 100 and light source 102 (see FIGURE 6a). The light source and photoelectric cell are mounted in an angular relationship beneath the slot 98 in such a manner that when a glass sheet conveyed by the endless belt 40 (in a manner to overlap the area 76) appears over the slot 98, light from the light source 102 is reflected from the bottom surface of the sheet and is detected by photoelectric cell 100. When photoelectric cell 100 detects light, it actuates means for substantially simultaneously stopping the belt 40 and causing the pneumatic cylinder 90 to retract its plunger and effect pivotal motion to the lever 80 in a manner to depress the indexing bar 78 so that it lowers in front of the glass sheet. The position of the slot 98 or the position of the sensing means consisting of photoelectric cell 100 and light source 102 is such that the momentum of the sheet on the belt 40 will carry it against the front index bar 78 so as to index the transverse leading edge of the sheet along the indexing bar 78. An appropriate time delay switch causes the index bar 78 to lower a short time after the photocell 100 senses the sheet. Such time delay switch provides a means for controlling the impact of the sheet against the index bar 78 since the time delay may be varied. The momentum of the sheet varies in accordance with its weight and the weight of the sheet varies with its gauge so that the time delay switch may be adjusted in accordance with the gauge of sheets being scored.

Positioned along the longitudinal edge of the cutting table 10 there is a side indexing bar 104. The side indexing bar 104 (see in particular FIGURES 2 through 6) is supported on one edge of the sheet 36 and is caused to move laterally by means of a longitudinally mounted tubular member 106. Indexing bar 104 is connected to the tubular member 106 by resilient hinge members 108 that are disposed to permit the indexing bar 104 to remain substantially flat on the sheet 36 although the tubular member 106 moves in a pivotal manner in respect to the table 10. Tubular member 106 is mounted on leg members 110. The leg members 110 are rigidly attached at their base to the shaft 112 (see FIGURE 2). The shaft 112 is rotatably connected to the cross beams 28 by appropriate housings 114 supported by appropriate supporting members 116. A centrally positioned lever arm 118 is also rigidly attached to the rotatable shaft 112. A pneumatic cylinder 122 is pivotally attached to the upper end of the lever 118 as shown at 124 (FIGURE 2) and is pivotally attached, as at 123, at its other end to an angle member 125 that is rigidly attached to one of the cross beams 35. The leg members 110 are also resiliently connected to one of the cross beams 35 by means of bolts 130 that slidably project through openings in angle members 132 that are attached to cross beam 35. Bolts 130 are rigidly attached to angle members 138 that are mounted on leg members 110. A compression spring 140 surrounds the bolt 130 and bears against the angle members 132 and 138 to urge the leg members 110 and hence indexing arm 104 away from the edge of belt 40 so that the indexing bar 104 is normally about 2½″ from the belt 40. When pressure is applied to the pneumatic cylinder 122 to retract its plunger and force lever 118 inwardly, such action will cause the legs 110 to pivot inwardly in opposition to compression spring 140 causing the indexing bar 104 to move towards the belt 40 to a distance of approximately ½″ from the belt 40.

A sheet indexed on the table 10 by the transverse index bar 78 projects over the belt 40 into the area 76. At the instant the indexing bar 78 is lowered to index the sheet transversely, the indexing bar 104 is spaced from the edge of the belt 40 a distance of 2¹⁄₁₆″ by the action of compression spring 140. However, as soon as sheet 142 comes to a stop, means are provided for causing the cylinder 122 to retract its plunger to cause legs 110 to move indexing bar 104 towards belt 40 (in opposition to spring 140) to a distance of approximately ½″ from the edge of belt 40 and index the sheet 142 longitudinally on the cutting table 10 (as shown by FIGURE 6). Once pneumatic cylinder 122 is deactivated, the compression spring 140 will cause the indexing bar 104 to move away from the edge of sheet 142.

In the present embodiment, means for adjusting the exact position of the indexing bar 104 is provided by the method by which tubular member 106 is mounted to leg members 110. Tubular member 106 is provided with a rigidly attached plate 144 (FIGURE 5) on either end. The plate 144 is bolted to a channel member 146 by means of bolts 148 which project through slotted grooves 150 (see FIGURE 6). Jack screws 152 project through appropriate perforations in the sides of channel member 146 and bear on tubular member 106. Jack screws 152 may be held rigidly in place by means of opposing nuts 154. Hence, tubular member 106 may be adjusted by loosening the bolts 148 and positioning nuts 154 and adjusting the jack screws 152.

In operation, the glass sheet, such as sheet 142, is delivered to the conveyor belt 40 by the indexing table 12 and is conveyed onto the cutting table 10. When the sheet 142, which has been roughly indexed longitudinally so that its edge covers the area 76, is detected by photoelectric cell 100 as it passes over slot 98, the conveyor motor 56 is caused to stop and pneumatic cylinder 90 is activated to retract its plunger and lower indexing bar 78 onto the belt 40 just in front of the sheet 142. Momentum carries the sheet 142 against the bar 78 so as to index the sheet transversely. An adjustable or variable time delay switch between photocell 100 and cylinder 90 effects the following sequence: (a) the leading edge of sheet 142 is detected; (b) a controlled time delay occurs; (c) the belt is stopped. Impact force can be reduced by reducing the delay. After a very short predetermined time delay after the sheet 142 is indexed (less than one second) calculated to let the sheet 142 come to rest and index on the bar 78, pneumatic cylinder 122 is activated to retract its plunger and cause indexing bar 104 to move to within ½″ of the conveyor belt 40 and index the sheet 142 longitudinally. At this time, the sheet is indexed on the cutting table 10 and prepared for transverse cutting or scoring.

Glass cutters 155 are mounted on a cutter bar 156 which is propelled across the cutting table as shown. The glass cutters which are mounted on the cutter bar 156, such as shown in FIGURE 2, are provided with means for lowering the glass cutting wheels 158 in a manner to score glass sheet 142 when the cutter bar 156 is driven across the cutting table 10, and are further provided with means for retracting the cutter wheels 158 when the cutter bar 156 is returned to its original position for the next cut. Such extensible and retractable glass cutters are well known and such apparatus is accurately disclosed in U.S. Patents 2,091,332; 2,158,900 and 2,435,154. The details of the glass cutter will not be described in the present specification since such cutters are well known and a variety of such apparatus may be mounted to the cutter bars 156. In the present cutting machine, the cutter bars 156 are driven across the glass in the direction of the arrow after the glass has been indexed in the manner described. At the completion of the cut and when the cutter bar 156 commences to return to its original position with the glass cutters in a retracted position, the conveyor belt 40 commences to remove the scored glass 142 and convey a subsequent sheet supplied by the indexing table 12 onto the cutting table 10. Such start and stop means of indexing table 12 in delivering sheets to a cutting apparatus, such as the cutting apparatus 22 of the present invention, is adequately described in my co-pending application "Method and Apparatus for Cutting, Transporting and Distributing Glass Sheets," Serial No. 235,932, filed November 7, 1962.

Figure 7:
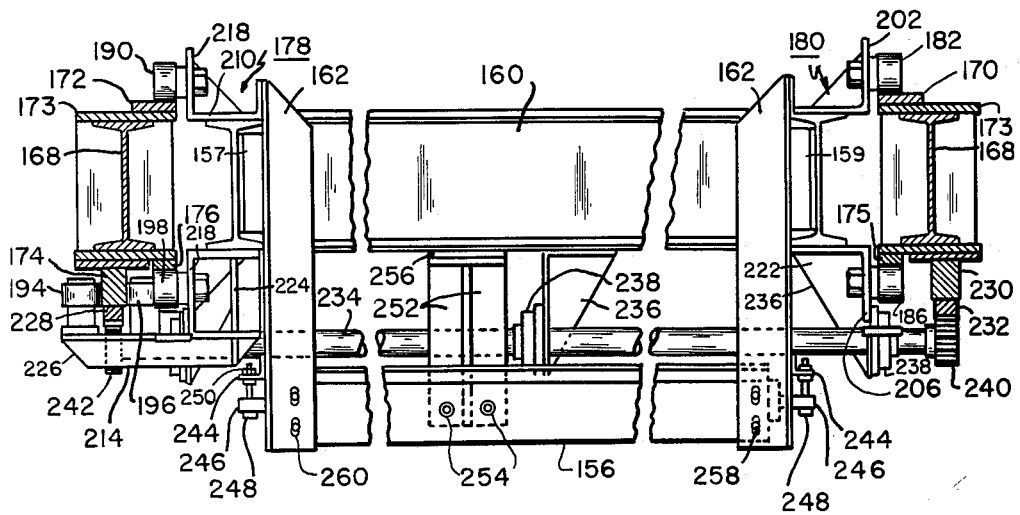
FIGURE 7 is an enlarged elevation view of the cutter bridge 60 of the apparatus of FIGURE 1, shown as partially broken away and partially in cross-section.
Figure 8:
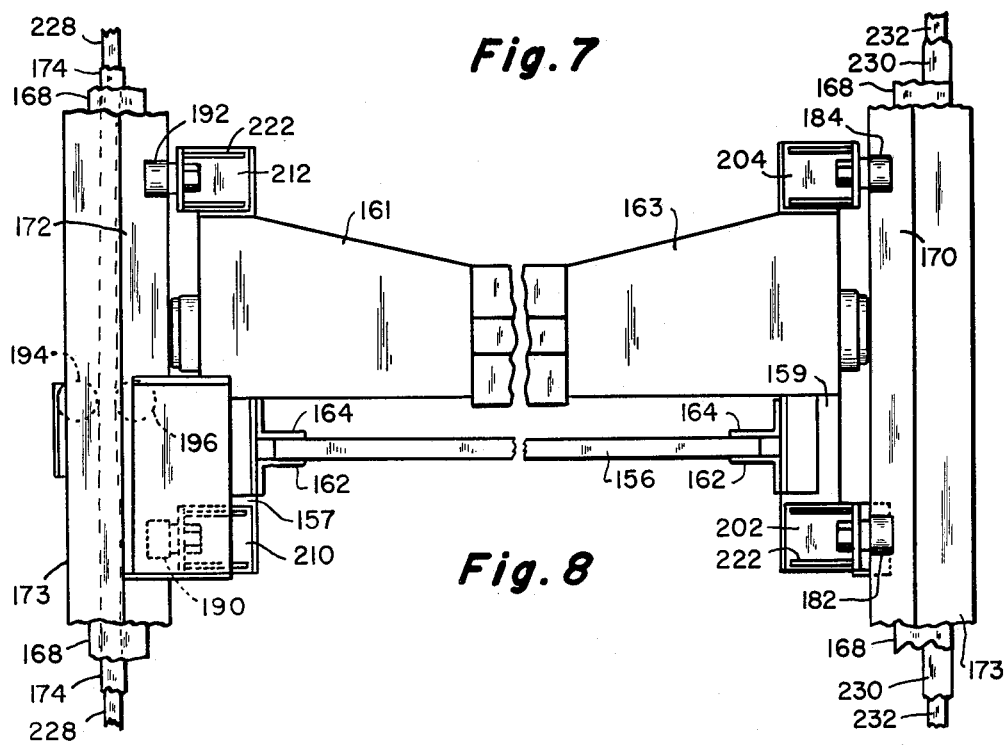
FIGURE 8 is a top plan view of the cutter bridge 160 of the apparatus of FIGURE 1.
Figure 9:
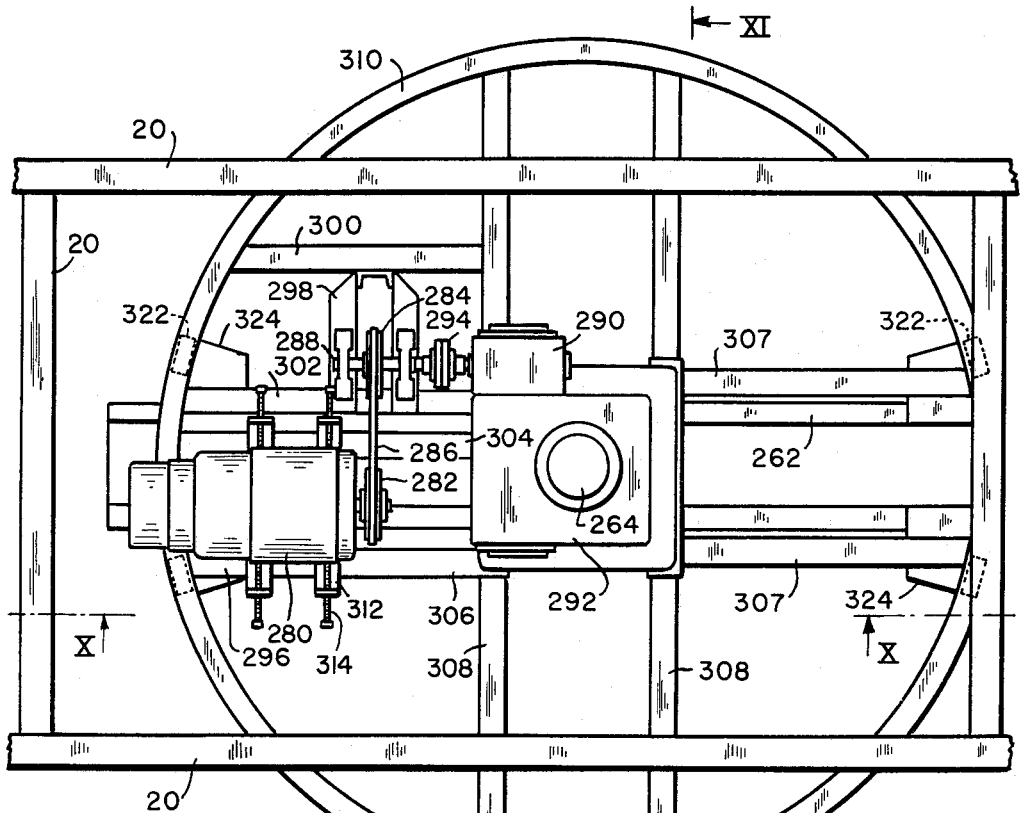
FIGURE 9 is a top plan view of the harmonic bridge drive 16 of the apparatus of FIGURE 1.
Figure 10:
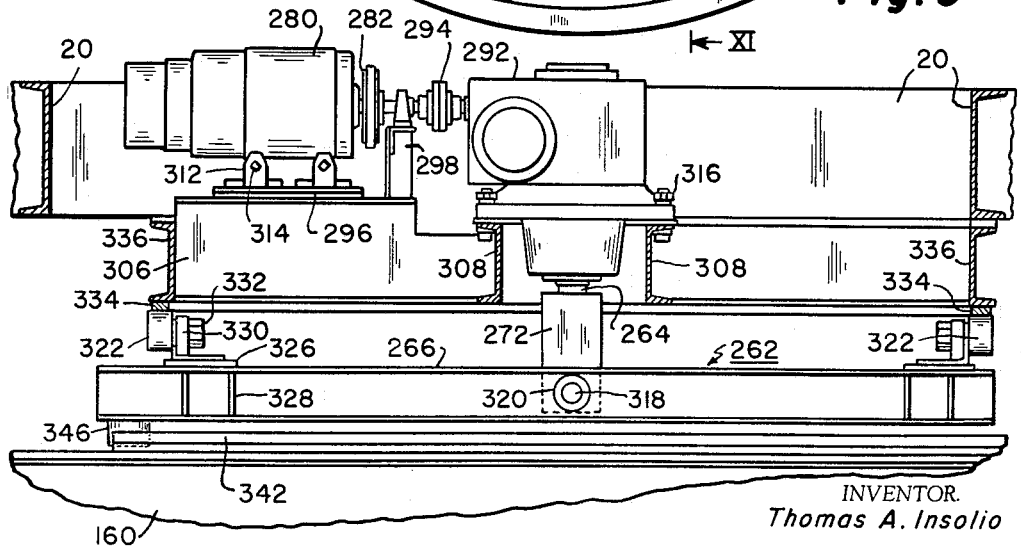
FIGURE 10 is a side elevation view partially in cross-section of the harmonic bridge drive 16 taken along the line X—X of FIGURE 9.

The cutter bar 156 is attached to and is supported by a cutting bridge 160, by means of downwardly projecting angle members 162 and 164 (see FIGURES 7 and 8).

The bridge 160 is mounted in a manner to be driven over the cutting table 10 by being attached at its extremities to trolleys 178 and 180. The trolleys 178 and 180 are disposed to travel on rails 170, 172, 175 and 176. The rails 170, 172, 175 and 176 are supported by cross beams 168 which are, in turn, mounted on upright members 18 of the frame 19. Additional strength and flat surfaces are provided to beams 168 by means of plates 173 attached to the upper and lower flanges of beams 168. The trolleys 178 and 180 are composed of support beams 157 and 159 to which each end of the cutter bridge 160 is attached. The bridge 160 is provided with additional support in the vicinity of the trolleys 178 and 180 by means of top plates 161 and 163. Cam wheels 182, 184, 186, 188, 190, 192 and 200 are each mounted to mounting members 202, 204, 206, 208, 210, 212 and 216, respectively, which are mounted on support members 157 and 159 of trolleys 178 and 180. The mounting members are formed with appropriate upwardly or downwardly depending flanges 218 that are formed with appropriate perforations to which the respective cams are bolted as at 220. Each of the upwardly or downwardly depending flanges 218 is provided with additional strength by means of brace members 222. A cam 198 bears on the rail 176 in a like manner that cam 186 bears on rail 175, but is mounted in a mounting member 214 attached to support member 157 of trolley 178 that, in addition to a downwardly depending flange 218, is provided with additional support members 224 and 226 which support additional cams 194 and 196 which bear on either side of a downwardly depending guide rail 174. Hence, the trolleys 178 and 180 may travel along the beams 168 so as to carry the cutter bar 156 across the cutting table 10. To assure synchronous movement of the trolley 178 with trolley 180, there is provided on downwardly depending guide rail 174 a toothed rack 228. A downwardly depending member 230 similar to downwardly depending member 174 is provided with a corresponding toothed rack 232 adjacent trolley 180. Spanning the cross members 168 and rotatably attached to bridge 160 there is provided a stabilizer bar 234. Stabilizer bar 234 is rotatably mounted to the bridge 160 by means of downwardly depending support members 236 that are provided with supporting bearing surfaces 238. The stabilizer bar 234 is rigidly connected at either end to pinion gears 240 and 242 which engage the toothed racks 228 and 232, respectively. Consequently, when the bridge 160 is driven across the cutting table 10, the pinion gears 240 and 242, rotating within the toothed racks 228 and 232, synchronize the movement of trolleys 178 and 180. The cutter bar 156 is bolted to the downwardly depending members 162 and 164 by means of angle members 244 attached to the members 162 and 164 and eye members 246 attached to or formed with the cutter bar 156. Bolts 248 project through perforations in angle members 244 and the eyes of eye members 246 and are positioned by means of opposing nuts as at 250 (FIGURE 7), so that the exact vertical position of the cutter bar 156 may be adjusted by adjusting the position of the bolts 248. Additional support is provided to the cutter bar 156 by means of downwardly depending members 252 which are bolted to the cutter bar as at 254 and are additionally bolted to the bridge 160 (not shown). The positioning of the cutter bar 156 in respect to the supporting member 252 is accomplished by means of various gauged shims as shown at 256. The cutter bar 156 may be additionally secured to the downwardly depending members 162 and 164 by means of bolts as shown at 258 and slotted bolt receiving perforations as at 260 which also permit some vertical adjustment of the cutter bar 156.

It should be noted that two upwardly projecting bars 113 are mounted near the ends of tubular member 106. Guard members 115 attached to downwardly projecting angle members 162 that support the cutter bar 156, are positioned to contact the bars 113 at the conclusion of the cut and move the indexing bar 104 away from contact with glass sheet 142 so that the glass cutters do not score the indexing bar.

As stated above, in the application of an automatic cutting machine such as is presently employed, it is necessary and desirable that the glass cutters be propelled across the glass sheet 142 as rapidly as possible and as smoothly and uniformly as may be accomplished. To accomplish an ideal harmonic cutting motion to the cutter bridge 160, it is necessary that the bridge 160 be driven across the cutting table 10 along the beams 168 at a uniform acceleration to exactly the midpoint of its travel wherein uniform deceleration must commence until the bridge 160 has reached the conclusion of its motion in the direction of the arrow as shown in FIGURE 2. To prevent undue vibration and shock caused by rapid travel of the bridge 160, such as is required in order to complete the cut in a time of less than three seconds (about 2½ seconds), it is necessary that the rate of acceleration at the starting point be at its greatest when the bridge commences to move. The rate of acceleration then diminishes gradually from zero acceleration to zero acceleration at the midpoint of the cut. Then deceleration must commence at a gradually increasing rate from zero deceleration to zero deceleration at the conclusion of the cut. Similarly, the bridge 160 must be returned to its original position as shown by FIGURE 2 by a harmonic motion that will avoid vibration or shock to the frame 19 and its associated structures which may interfere with the indexing of the subsequent sheet being transported onto the cutting table 10. To provide a maximum harmonic motion to the bridge 160 and its associated apparatus, I have provided a harmonic cutter bridge drive shown generally in FIGURE 1 at 16 and in FIGURE 9. The harmonic drive 16 is composed of a driver arm 262 that is horizontally positioned above the bridge 160 and is supported substantially at its center by a downwardly depending drive shaft 264 (see FIGURES 9 and 10). The driver arm 262 is formed from two opposing beams 266 and 268 (see FIGURE 11). The beams 266 and 268 are connected by means of a bottom plate 270. The driver arm 262 is connected to the downwardly depending drive shaft 264 by means of two downwardly projecting plates 272 and 274 that are connected to a cylindrical housing 276 surrounding the drive shaft 264 and which is bolted to shaft 264 by means of a bolt 278. The shaft 264 is caused to rotate by a conventional motor 280 that is disposed to rotate a sheave 282 (FIGURE 9) which, in turn, is disposed to cause a second sheave 284 to rotate by means of a belt 286 which causes the shaft 288 which is attached to worm gear and gear reduction boxes 290 and 292 through a conventional coupling 294 to rotate. The motor 280 is mounted on a stand or platform 296 and the drive shaft 288 is mounted on upwardly projecting support members 298, all of which are supported by cross beams 300, 302, 304, 306, 307 and 308 of a circular member 310 that is mounted on and supported by the cross beams 20 of frame 19. Motor 280 is also shown to be adjustably mounted on a platform 296 by means of outwardly depending frame members 312 and jack screws 314. The gear reduction box 292 is shown to be bolted to cross beams 308 of circular member 310 as shown at 316. The arm 262 is connected to plates 272 by means of pinion shafts 318 which project through openings in the beams 266 and 268 and pinion shafts 318 are held in place by retaining nuts 320. It may be seen that energization of motor 280 will cause rotation of shaft 288 which, in turn, will be transmitted to the downwardly depending drive shaft 264 through the worm gear and gear reduction boxes 290 and 292 to cause the driver arm 262 to rotate.

Driver arm 262 is stabilized in its rotation by means of cams 322 which are mounted on carriage members 324 attached to either end of the driver arm 262. The carriages 324 consist of plates 326 attached to downwardly depending flange members 328 attached to the beams 266 and 268 and also are provided with upwardly projecting flange members 330 to which the cams 322 are bolted as at 332 (see FIGURE 10). A circular track 334 is provided which depends downwardly from the circular rim 336 of circular member 310. Hence, the cams 322 mounted on the carriages 324 of the driver arm 262 bears on the track 334 during rotation of the driver arm 262 caused by energization of the motor 280.

Figure 11:
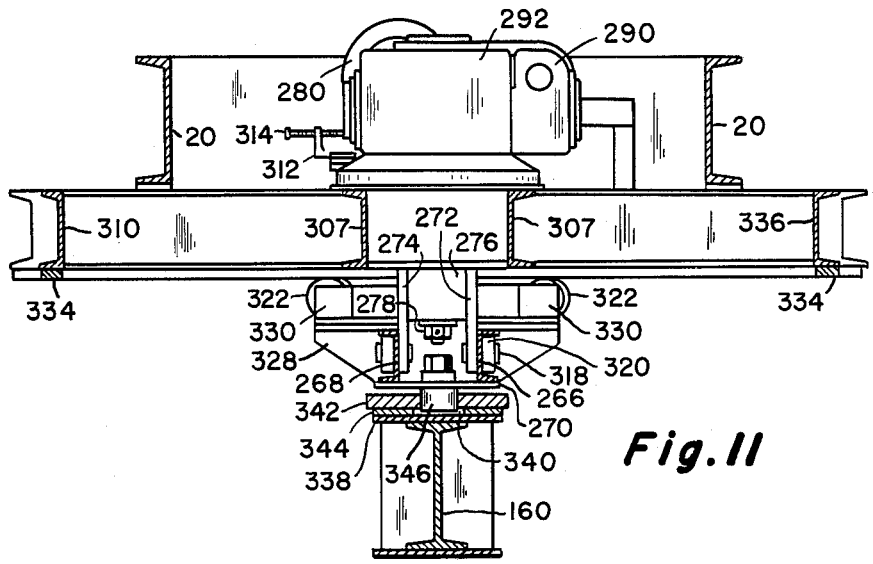
FIGURE 11 is a side elevation view partially in cross-section of the harmonic bridge drive 16 taken along the line XI—XI of FIGURE 9.

As shown particularly by FIGURE 11, the cutter bridge 160 is provided with a top plate 338 which is, in turn, provided with a camway 340 (see FIGURE 2) by means of plates 342 and 344. Depending downwardly from the plate 270 of the driver arm 262 and near one end thereof is a cam 346 which projects into the camway 340. Hence, it may be seen that rotation of the driver arm 262 will cause the cam 346 to bear in the camway 340 which extends across the top of the bridge 160 so as to cause it to be driven in the direction of the arrow as shown in FIGURE 2 on the trolleys 178 and 180.

Figure 12:
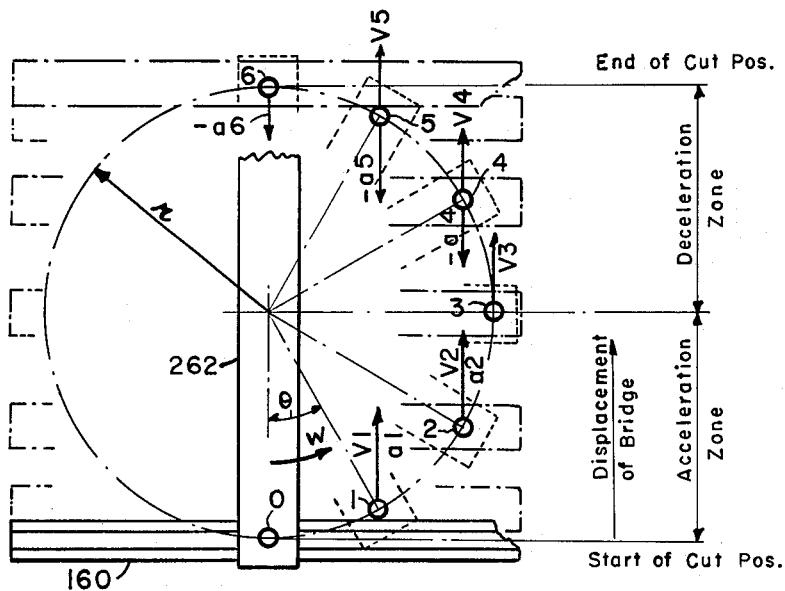
FIGURE 12 is a schematic illustration of the operation of the apparatus of FIGURE 1 as viewed from the top, omitting the non-moving parts.

Attention is called to FIGURE 12 which is a schematic illustration of the operation of the apparatus of FIGURES 1 through 11 as viewed from the top, omitting all non-moving parts. The illustration of FIGURE 12 demonstrates the advantages of the harmonic drive of the cutting apparatus of the present invention. Driver arm 262 is shown to rotate 180° and carry with it bridge 160 from its start position designated as zero to its position wherein the cut has been completed, designated as 6. The driver arm 262 is rotated from the position zero to the position 6 at a constant speed. Acceleration will take place between the position zero and the position 3, and deceleration will take place between the position 3 and the position 6. The acceleration zone or distance of linear displacement of the bridge during acceleration is identical in length and time to the deceleration zone or the length of cut wherein the bridge slows down from zero deceleration to zero deceleration. It will be obvious that a harmonic relationship of displacement and time is more readily attained since the acceleration and deceleration zones are the same.

Figure 13:
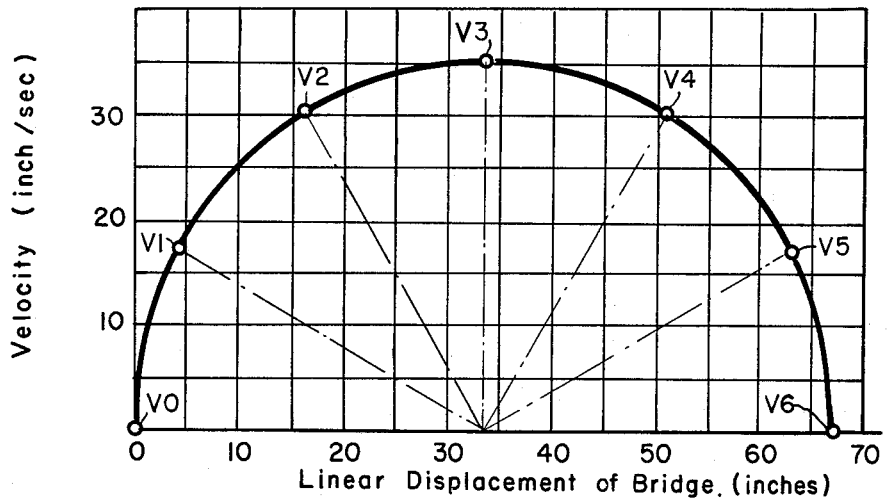
FIGURE 13 is a graph upon which there is plotted the linear velocity of the cutter bridge of the apparatus of FIGURE 1 versus its linear displacement for various positions of the bridge shown by the schematic illustration of FIGURE 12.

FIGURE 13 graphically illustrates that the velocity of the bridge during acceleration or deceleration is a function of the angle of the driver arm from the position 0. It may be seen that at any given point during rotation of the driver arm from positions 0 to 6 (as shown in FIGURE 12), the instantaneous linear velocity of the bridge can be determined. The angular velocity W of the driver arm can be determined as follows:

$$W = \frac{2\pi x}{60}$$

where:

$W$ = angular velocity of the driver arm; and
$x$ = revolutions per minute (r.p.m.) of the driver arm.

Figure 14:
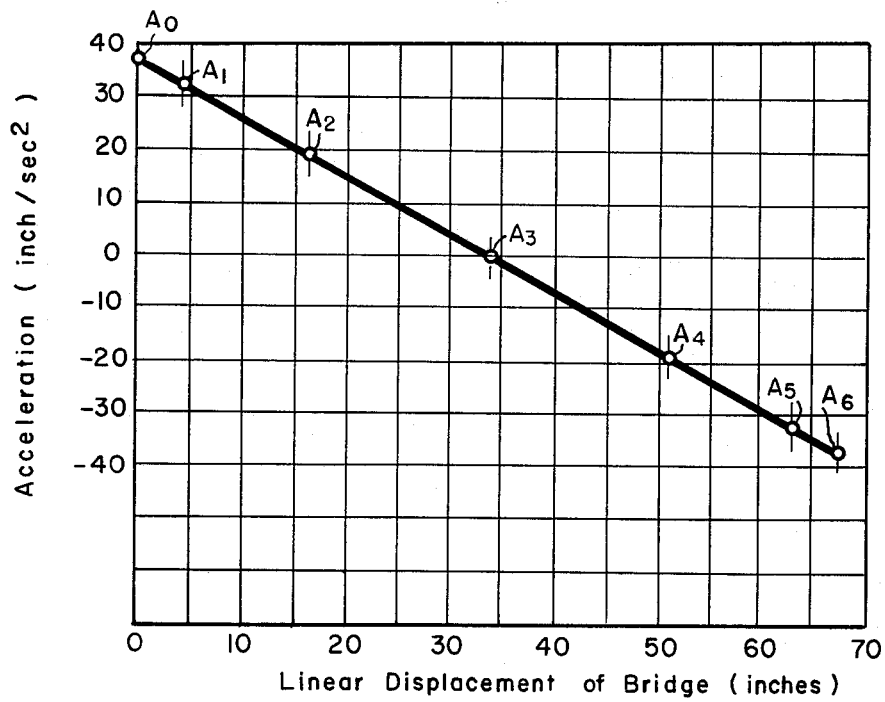
FIGURE 14 is a graph from which the acceleration of the cutter bridge of the apparatus of FIGURES 1 and 8 is plotted versus the linear displacement of the bridge for the various positions attained by the bridge during a cutting cycle, as shown by the schematic illustration of FIGURE 12.

In obtaining the data for FIGURES 13 and 14, the r.p.m. of the driver arm was estimated to be about 10. Consequently, $W = 1.047$ radians per second. This velocity is regarded as being substantially constant although it may have been transient to a negligible degree at the point of starting the drive motor when the bridge was in its start position (position 0) and where the bridge reversed direction of travel at the end of the cut. The linear velocity $v$ of the cutter bridge was then ascertained by the following equation:

$$v = rw \sin \theta$$

where:

$\sin \theta$ is the angle through which the driver arm has moved along the positions 0 to 6; and
$r$ is the effective length of the driver arm (the radius of the circle ascribed) (see FIGURE 12).

In FIGURE 13 the calculated linear velocity of the bridge along the points v0–v6 are plotted against the linear displacement of the bridge. This curve clearly illustrates that the velocity of the bridge is a function of the angle of the driver arm from the position 0. As the angle of the driver arm increases from the position 0 to the position 3, the linear velocity of the bridge increases in a gradually diminishing manner and as the angle increases from position 3 to position 6, the linear velocity of the bridge decreases in a gradually increasing manner. At any given angle of the driver arm there is a given linear velocity for the bridge if the driver arm is driven at a uniform speed.

The rate of acceleration is a maximum at the start of travel and the rate of deceleration is a maximum at the end of travel. This is shown particularly by FIGURE 14 where the acceleration and deceleration of the bridge 160 during the rotation of the arm 262 from position 0 to position 6 are plotted against the linear displacement of the bridge. The rates of acceleration (A) and deceleration (−A) were determined by the equation:

$$A = rw^2 \cos \theta$$

In FIGURE 14 it can be seen that immediately after the bridge 160 has passed the plot A0 (see FIGURE 12), the bridge 160 is at its maximum acceleration of slightly less than 40 inches/second². When the bridge and/or arm reach the position A1, the acceleration has dropped to about 33 inches/second² and the rate of acceleration continues to drop until the midpoint or zero acceleration is reached. FIGURE 14 then shows that deceleration (−A) increases from zero to about −40 inches/second² until the cutting bridge has completed its cutting cycle or the bridge 160 has reached position 6 as shown in FIGURE 12.

From FIGURES 13 and 14 it may be readily seen that driver arm 262 provides a maximum harmonic motion to the cutter bridge 160. Uniform rotation of the arm 262 effects gradually diminishing acceleration to the midpoint of the cut where there is no acceleration and then gradually increasing deceleration to the conclusion of the cut where there is zero deceleration.

Figure 15:
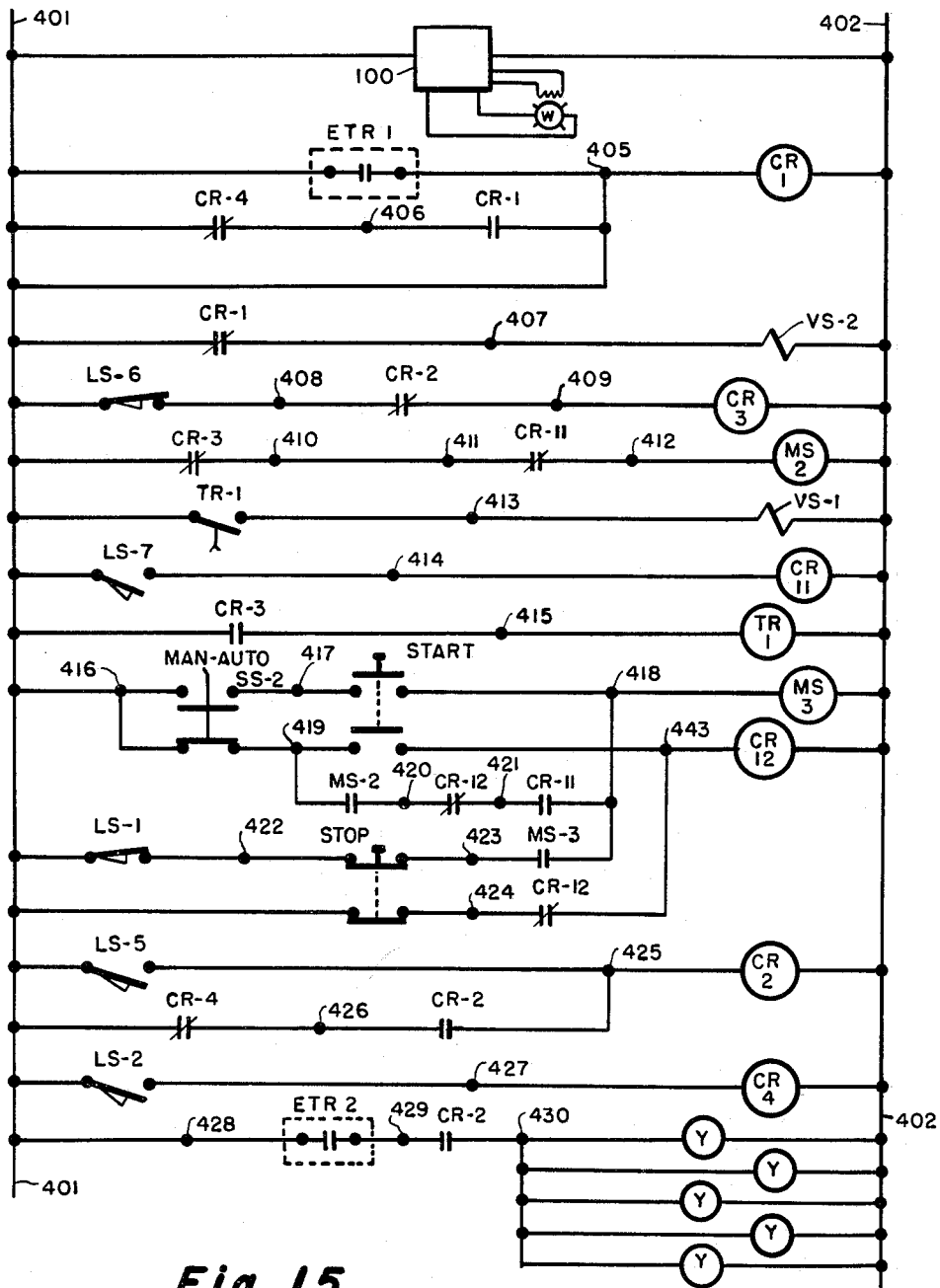
FIGURE 15 is an illustrative circuit diagram depicting one method of automatic operation of the apparatus of FIGURES 1 through 14.

Since the chief advantage of the apparatus of the present invention is the utilization of the cutting machine in an efficient manner to score sheets transversely accurately in the least possible time, it is necessary that the aforementioned operations be synchronized so that sheets may be intermittently conveyed onto the belt 40 and indexed on the cutting table 10, and the cutter bridge 160 and cutter bar 156 holding the glass cutters are caused to travel over the sheet 142 in the harmonic manner described. Control means must be provided to effect the operation of the various parts of the present apparatus. It is obvious that various circuitry may be employed for this purpose. The diagram of FIGURE 15 shows a preferred method of utilizing the photoelectric cell or sensing means 100 to advantage.

In this diagram, leads 401 and 402 supply the necessary electrical current to the various components. When the photoelectric cell 100 senses light from its light source 102 reflected from the surface of the sheet of glass being conveyed by the conveyor belt 40 onto the cutting table 10 a time delay unit ETR–1 is activated. After a preset time delay, the contact ETR–1(401–405) closes. When the contact ETR–1(401–405) closes, it completes the circuit to a relay coil CR–1(405–402) which when energized causes contact CR–1(401–407) to open. When the contact CR–1(401–407) opens it interrupts the circuit of a valve coil VS–2(407–402) which controls the penumatic cylinder 90 in such a manner that when it is deenergized its plunger is released and the indexing bar 78 is free to lower onto the conveyor belt 40. When the index bar 90 is lowered, it causes a switch LS–6(401–408) to open. Opening of switch LS–6(401–408) interrupts the circuit of relay coil CR–3(409–402) to deenergize the coil which causes contact CR–3(401–410) to open and deenergize the relay MS–2(412–402) which has the effect of stopping the conveyor motor 56. When coil MS–2 is deenergized, contact MS–2(419–420) closes.

The time delay unit that closes contact ETR–1 may be adjusted so that the position of the glass sheets in respect to the indexing bar 78 when it lowers and when the conveyor motor stops may be varied. In this manner, the impact of the sheet against the indexing bar 78 can be controlled.

When relay coil CR–3(409–402) was deenergized, contact CR–3(401–415) was caused to close and energize a timer TR–1(415–402). After a predetermined time delay timer contact TR–1(401–413) closes to energize a valve coil VS–1(413–402). Valve coil VS–1(413–402) controls pneumatic cylinder 122 which, as previously described, determines the position of side indexing bar 104. When the coil VS–1(413–402) is energized, it causes cylinder 122 to retract its plunger so that the indexing bar 104 indexes the sheet.

When indexing bar 104 moves into indexing position, it causes a switch LS–7(401–414) to close and energize a coil CR–11(414–402) which closes contact CR–11(421–418). This completes the circuit to the bridge drive starter MS–3(418–402) which locks into the circuit by closing the contact MS–3(423–418).

The driver arm 262 will now be caused to drive the bridge 160 across the cutting table 10 so as to cut or score the indexed glass sheets providing the conveyor is stopped (contact MS–2(419–420) closes when the conveyor coil MS–2(412–402) is deactivated so that it will remain open when the conveyor motor is not deenergized) and the manually controlled switch SS–2(416–417) is closed to "Auto" or automatic control and the start push button (417–418) and (419–443) has been momentarily depressed or closed to energize coil CR–12(443–402) and lock it into the circuit through contact CR–12(424–443). The diagram of FIGURE 15 shows coil CR–12(443–402) as energized and consequently contacts CR–12(420–421) and (424–443) are closed.

When the bridge starts to travel (transversely), it trips and closes switch LS–5(401–425) to energize coil CR–2(425–402) which locks itself into the circuit through contact CR–2(426–425). Energization of coil CR–2(425–402) causes contact CR–2(429–430) to close and contact CR–2(408–409) to open. As the bridge sweeps across the table, the side edge of the sheet is sensed by a photoelectric cell (not shown) which energizes a preset time delay contact ETR–2 and after the preset delay contact ETR–2(428–429) closes and the solenoids Y of cutter units 155 are activated to lower their cutter wheels 158 into scoring position. (See my co-pending patent application entitled "Glass Cutter" filed simultaneously with the present application.)

At the end of the cut or score where the bridge 160 has crossed the cutting table 10 (first half of the bridge cycle) switch LS–2(401–427) is contacted by the bridge and caused to close. Coil CR–4(427–402) is energized to cause contact CR–4(401–426) to open to deenergize coil CR–2(425–402). This causes contact CR–2(429–430) to open and the solenoids Y of solenoids 155 are deenergized and retract the cutter wheels 158 to remove them from scoring position. Also, when relay CR–2(425–402) is deenergized, contact CR–2(408–409) closes.

When coil CR–4(427–402) is energized, contact CR–4(401–406) opens to deenergize coil CR–1(405–402) and close contact CR–1(401–407). The valve coil VS–2(407–402) is thus energized to cause the cylinder 90 to retract its plunger and raise the indexing bar 78.

When indexing bar 78 raises it causes switch LS–6(401–408) to close and energize coil CR–3(409–402). Contact CR–3(401–415) now reopens to deenergize timer coil TR–1(415–402) and open contact TR–1(401–413) to deenergize valve coil VS–1(413–402). Deenergizing of valve coil VS–1(413–402) releases the plunger of cylinder 122 so that the springs 140 will return the indexing bar 104 to its non-indexing position. When indexing bar 104 returns to its non-indexing position, switch LS–7 opens to deenergize relay CR–11 which causes contact CR–11(411–412) to close and contact CR–11(421–418) to open.

When coil CR–3(409–402) is energized, contact CR–3(401–410) closes so that the conveyor starter coil MS–2(412–402) is now energized and the conveyor starts to convey the scored sheet from the table 10 to the glass breaker 30.

It should be noted that contact CR–2(408–409) is caused to open at the start of the bridge cycle to insure that the conveyor is stopped and the side index bar is in position. At the end of the first half of the bridge cycle (after it has crossed cutting table 10) the contact is caused to close to permit the starting of the conveyor.

When the coil MS–2(412–402) was energized, it opened contact MS–2(419–420) and when the side index (104) was returned to its original position switch LS–7(401–414) opened to deenergize coil CR–11(414–402) so that contact CR–11(421–418) also opened. Coil MS–3(418–402) remains energized, however, since it is locked into the circuit through contact MS–3(423–418) so that the bridge drive or driver arm 252 will continue to rotate and return the bridge during the second half of the cycle across the cutting table 10 with the cutters retracted. As this is happening, the conveyor continues to run to convey scored sheets to the breaker 30 while conveying new sheets onto the cutting table 10 from the indexing table 12.

At the conclusion of the cycle the driver arm 262 contacts and opens the switch LS–1(401–422) which deenergizes relay MS–3(418–402) to stop driver arm 262 and conclude the cutting cycle. The apparatus is now prepared for another cutting cycle when photoelectric cell 100 senses the presence of another sheet.

Coil CR–12(443–402) may be deenergized by pushing the stop button (422–423) which will also interrupt the bridge drive coil MS–3(418–402).

FIGURES 16, 17 and 18 show a novel modification of the harmonic bridge drive of the present invention. In the harmonic bridge drive of FIGURES 1 through 12, the arm 262 rotates 360° to drive the cutter bridge 160 across the cutting table 10 and back. The arm 262 rotates 180° from position 0 to position 6 of FIGURE 12 to effect the cutting action. During the second 180° rotation, the arm 262 returns the bridge to its starting position. The bridge 160 and its associated apparatus may be relatively heavy so that it gains momentum during the cut. Accordingly, vibration or shock is likely to occur at position 1 when the bridge begins the cutting cycle and position 6 before the bridge commences to travel back across the cutting table 10. The resilient or shock absorbing cam roller mounting of FIGURES 16, 17 and 18 serve to absorb such shock or momentum of the bridge and provide a more harmonic cutter bridge drive.

In FIGURE 16 there is shown a driver arm 510 that is similar in construction to arm 262 of the embodiment of FIGURES 1 through 12. Circular track 512 is similar to track 310 of FIGURE 9 and beam 514 corresponds to beams 20 of frame 19 in FIGURE 1. In the modified embodiment shown by FIGURE 16, cams 516 are mounted to contact the inside surface of the circular member 512 and cams 518 contact the lower surface. The cutter bridge 520 is provided with a slotted track 522 by means of rails 524 bolted to its top flange as at 526. The cutter bar and other associated mechanisms are not shown since these members are obvious from the description of FIGURES 1 through 12.

As seen particularly in FIGURE 16, there is a cam roller 530 mounted on the driver arm 510 near one end thereof and projecting downwardly. As will be hereafter described in detail, the cam roller 530 is mounted in such a manner that it may oppose a spring action to slide a limited distance outwardly on the driver arm 510. The cam roller 530 projects downwardly from the driver arm 510 into the track 522 of the cutter bridge 520. A shock absorbing mounting 528 consists of a cam roller housing 532 that is mounted between the driver arm side beams 534 and 536 (FIGURE 18) near the end of the driver arm 510. The cam roller housing consists of two end members 538 and 540, a top plate 542 and a sleeve member 544. The end member 538 possesses a circular bore through which sleeve member 544 is projected. End member 540 possesses an opening the bore of which is substantially identical to that of sleeve member 544 and through both of which there is projected a cylindrical slide shaft 546. Interposed between the end members 538 and 540 is a roller block 548 which is also formed with an opening substantially identical to that of end member 540 and sleeve 544 through which the slide shaft 546 projects. The slide shaft 546 is rigidly attached to the roller block 548 by means of a slide shaft retaining pin 550. As shown, the roller cam 530 is attached to the roller block 548 by the threaded recession within the roller block 548 as shown at 552. Cam roller housing 532 is rigidly attached to the driver arm side members 534 and 536 by appropriate bolts 554 and spacer members 535 (see FIGURE 17). The sleeve member 544 is disposed to slide freely within the end member 538 and consequently it may be seen that the roller block 548 and the slide shaft 546 are free to move back and forth the distance indicated by the arrows 556. There is, however, projected around the end of the shaft 546 a spring 558 which bears against a flange shoulder 560 formed on the sleeve member 544. The spring 558 is retained at the outer end of the shaft 546 by a retaining cap 562 that is threadedly engaged with a sleeve member 564 that is appropriately attached to end member 538.

It may be seen that when the driver arm 510 commences to rotate to drive the bridge 520 from position 1 to 6 considerable initial shock and vibration will be experienced, particularly at the sudden start of the cut or while the members are in position 0 and at the conclusion of the cut or at position 6 where momentum will tend to drive the bridge 520 beyond the cutting machine. By employing the modified embodiment of FIGURES 16, 17 and 18, the cam 530 and spring 558 will absorb the shock and permit limited outward travel of the roller block 548 and cam 530. Hence, the bridge 520 may trail or lead the driver arm 510 slightly during the cut but vibration and shock are minimized.

I claim:

1. A glass cutting apparatus for indexing glass sheets and effecting transverse scores thereon, comprising:
   (A) a cutting table;
   (B) an endless belt conveyor rotatably mounted on rollers positioned at either end of said table, one surface of said belt conveyor being disposed to travel over the surface of said table.
      (1) means for driving said conveyor means (B) so as to convey sheets of glass across said cutting table (A);
   (C) indexing means consisting of an elongated indexing bar suspended transversely above the cutting table disposed to be lowered onto said belt,
      (1) means for lowering and raising said elongated bar;
   (D) indexing means consisting of an elongated indexing bar suspended longitudinally along one edge of the cutting table disposed for limited transverse towards and away from said sheets,
      (1) means for effecting transverse movement of said indexing bar towards and away from said sheets;
   (E) scoring means comprising an elongated cutting bar longitudinally suspended over the said cutting table, said bar carrying extendible and retractable glass cutters and being disposed to be driven across said sheet transversely so as to score said sheets of glass transversely with said glass cutters,
      (1) means for driving said cutting bar over said cutting table, and
   (F) control means disposed to sense glass sheets being conveyed onto said table by said conveyor (B) and cause the drive means (B) (1) to stop and cause the means (C) (1) to lower the indexing bar (C) so that the momentum of said glass sheet will carry its leading edge against the indexing bar (C) and index the sheet transversely.

2. Apparatus according to claim 1, in which said control means (F) includes means for causing said means (D) (1) to effect limited transverse movement of said indexing bar (D) towards said sheet so as to index sheets longitudinally after they have been indexed transversely and to cause said driving means (E) (1) to drive said scoring means (E) across said cutting table (A) with the said glass cutters extended so as to score said sheets transversely.

3. Apparatus according to claim 2, in which said control means (F) includes means for causing said means (C) (1) to raise said indexing bar (C) and causing said means (D) (1) to effect limited transverse movement of said indexing bar (D) away from said sheets after said scoring means (E) has been driven across said sheet and to cause said drive means (B) (1) to drive said conveyor (B) to convey said sheets from said cutting table (A) and convey succeeding sheets to said cutting table (A) while causing said drive means (E) (1) to drive said cutting bar (E) back across cutting table (A) with the glass cutters retracted.

4. In a glass cutting machine wherein an elongated bridge member is disposed to be driven across and over an indexed glass sheet so that glass cutters mounted on said bridge will contact and score said sheet, the improvement in combination therewith of a driving apparatus for driving said bridge across said sheet, said driving apparatus comprising:
   (A) guide members positioned on said bridge;
   (B) a horizontally positioned driver arm disposed to rotate substantially about its vertical axis above said bridge and said arm having a guide means positioned near one end thereof;
      (1) said guide members positioned on said bridge being disposed to cooperate with said guide means positioned near one end of said arm to drive said bridge across said sheet whenever said driver arm is caused to rotate; and
   (C) means for effecting rotation of said driver arm.

5. In a glass cutting machine wherein an elongated bridge member is disposed to be driven across and over an indexed glass sheet so that glass cutters mounted on said bridge will contact and score said sheet, the improvement in combination therewith of a driving apparatus for driving said bridge across said sheet, said driving apparatus comprising:
- (A) a track positioned lengthwise on said bridge;
- (B) a driver arm disposed to rotate substantially about its vertical axis so as to ascribe a horizontal circle above said bridge and said arm having guide means positioned at one end thereof;
- (C) said guide means being disposed to cooperate with said track to drive said bridge across said sheet whenever said driving arm is caused to rotate; and
- (D) means for effecting rotation of said driver arm.

6. In a glass cutting machine wherein an elongated bridge member is disposed to be driven across and over an indexed glass sheet so that glass cutters mounted on said bridge will contact and score said sheet, the improvement in combination therewith of a driving apparatus for driving said bridge across said sheet, said driving apparatus comprising:
- (A) a track positioned lengthwise on said bridge;
- (B) a driver arm disposed to rotate substantially about its vertical axis so as to ascribe a horizontal circle above said bridge and said arm having pivotal means positioned near one end thereof;
- (C) said pivot means being disposed to contact said track so as to slide along said track and provide pivotal contact between said driver arm and said bridge so that whenever said arm is caused to rotate said arm will drive said bridge across said sheet; and
- (D) means for effecting rotation of said arm.

7. In a glass cutting machine wherein an elongated bridge member is disposed to be driven across and over an indexed glass sheet so that glass cutters mounted on said bridge will contact and score said sheet, the improvement in combination therewith of a driving apparatus for driving said bridge across said sheet, said driving apparatus comprising:
- (A) a slotted track positioned lengthwise on said bridge;
- (B) a driver arm horizontally disposed above said bridge and disposed to rotate about its vertical axis and said arm having a downwardly depending rotatable wheel positioned near one end thereof;
- (C) said wheel being positioned within the slot of said slotted track and being disposed to rotate within said slot so as to drive said bridge across said sheet whenever said driver arm is caused to rotate; and
- (D) means for effecting rotation of said driver arm.

8. Apparatus according to claim 7 in which the downwardly depending wheel of driver arm (B) is disposed to slide a limited distance inwardly and outwardly on said arm and said arm being provided with spring means disposed to hold said wheel inwardly on said arm with a predetermined force so that sudden outward pressure will cause the said spring means to yield temporarily to absorb and even out sudden pressure.

9. In a glass cutting machine wherein an elongated bridge member is disposed to be driven across and over an indexed glass sheet so that glass cutters mounted on said bridge will contact and score said sheet, the improvement in combination therewith of a driving apparatus for driving said bridge across said sheet, said driving apparatus comprising:
- (A) a cam track positioned lengthwise on said bridge;
- (B) a wheel-shaped member supported by a frame and positioned substantially horizontally above said bridge and being formed with guide surfaces around the peripheral edge thereof;
- (C) a rotatable drive shaft projecting vertically downward from the hub of said wheel-shaped member;
- (D) a driver arm rigidly mounted to said drive shaft substantially at its vertical axis so as to ascribe a circle above said bridge upon rotation of said drive shaft, said arm having a rotatable cam positioned near one end thereof, disposed to cooperate with said cam track to drive and guide said bridge across said sheet whenever said driver arm is caused to rotate and said driver arm having at least one rotatable cam positioned near both ends thereof disposed to rotatably bear on said guide surfaces of said wheel-shaped member so as to guide said driver arm during rotation; and
- (E) means for effecting rotation of said drive shaft.

10. A glass cutting apparatus for indexing glass sheets and effecting transverse score lines thereon, comprising:
- (A) a cutting table;
- (B) means for conveying glass sheets onto said table;
- (C) means for indexing said glass sheets transversely as said sheet stops on said table;
- (D) means for indexing said glass sheets longitudinally;
- (E) glass scoring means consisting of an elongated bridge member disposed to be driven across and over indexed glass sheets so that glass cutters mounted on said bridge will contact and score the sheets; and
- (F) driving means for driving said bridge across said sheet consisting of:
  - (1) a driver arm horizontally positioned above said bridge disposed to rotate substantially about its vertical axis, said arm having guide means positioned near one end thereof,
  - (2) guide members positioned on said bridge disposed to cooperate with said guide means to drive said bridge across said sheet whenever said driver arm is caused to rotate, and
  - (3) means for effecting rotation of said driver arm.

11. A glass cutting apparatus for indexing glass sheets and effecting transverse score lines thereon, comprising:
- (A) a cutting table;
- (B) means for conveying glass sheets onto said table;
- (C) means for indexing said glass sheets transversely as each sheet stops on said table consisting of an elongated indexing bar suspended transversely above the cutting table disposed to be lowered onto said cutting table and engage the leading edge of said sheet before it is stopped on the table;
- (D) control means for stopping the conveyor means (B) and lowering the indexing bar (C) so that the momentum of each sheet will cause it to engage bar (C) and index transversely;
- (E) means for indexing said glass sheets longitudinally; and
- (F) glass scoring means disposed to score said indexed glass sheets consisting of an elongated bridge member disposed to be driven across and over indexed glass sheets so that the glass cutters mounted on said bridge will contact and score the sheets;
- (G) driving means for driving said bridge across said sheets consisting of:
  - (1) a cam track positioned lengthwise on said bridge,
  - (2) a wheel-shaped member supported by a frame and positioned substantially horizontally above said bridge and being formed with a guide surface around the peripheral edge thereof,
  - (3) a rotatable drive shaft projecting vertically downward from the hub of said wheel-shaped member,
  - (4) a horizontally positioned driver arm rigidly mounted to said drive shaft substantially at its vertical axis so as to ascribe a circle above said bridge upon rotation of said drive shaft, said arm having a rotatable cam positioned near one end thereof, disposed to cooperate with said cam track to drive said bridge across said sheets whenever said driver arm is caused to rotate and said driver arm having at least one rotatable cam positioned near both ends thereof disposed to rotatably bear on said guide surfaces of said wheel-shaped member so as to guide said driver arm during rotation, and (5) means for effecting rotation of said drive shaft.

References Cited by the Examiner

UNITED STATES PATENTS

| | | |
|---|---|---|
| 1,999,593 | 4/35 | Owen. |
| 3,140,629 | 7/64 | Ingold _____ 83—367 X |
| 3,151,794 | 10/64 | Brand _____ 83—487 X |

FOREIGN PATENTS 656,848  1/63  Canada.

ANDREW R. JUHASZ, *Primary Examiner.*
WILLIAM S. LAWSON, *Examiner.*

UNITED STATES PATENT OFFICE
CERTIFICATE OF CORRECTION

Patent No. 3,183,747                                    May 18, 1965

Thomas A. Insolio

It is hereby certified that error appears in the above numbered patent requiring correction and that the said Letters Patent should read as corrected below.

Column 3, line 37, for "60" read -- 160 --; column 4, line 53, for "FIGURES" read -- FIGURE --; column 14, line 11, after "transverse" insert -- movement --.

Signed and sealed this 28th day of September 1965.

(SEAL)
Attest:

ERNEST W. SWIDER
Attesting Officer

EDWARD J. BRENNER
Commissioner of Patents